United States Patent
Schmitt et al.

(10) Patent No.: US 6,668,160 B2
(45) Date of Patent: Dec. 23, 2003

(54) METHOD AND SYSTEM FOR MONITORING A RADIO TRANSMISSION LINK

(75) Inventors: Kai Schmitt, Nurnberg (DE); Georg Fischer, Nurnberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 525 days.

(21) Appl. No.: 09/729,890

(22) Filed: Dec. 5, 2000

(65) Prior Publication Data

US 2001/0041538 A1 Nov. 15, 2001

(30) Foreign Application Priority Data

Dec. 10, 1999 (EP) .............................. 99309980

(51) Int. Cl.$^7$ ............................................. H04B 17/00
(52) U.S. Cl. ................... 455/67.14; 455/67.11; 455/423; 455/424; 455/226.1; 455/192.3
(58) Field of Search .................. 455/67.14, 67.11, 455/67.16, 226.1, 226.2, 423, 424, 425, 193.1, 192.3

(56) References Cited

U.S. PATENT DOCUMENTS

| | | | |
|---|---|---|---|
| 4,649,538 A | | 3/1987 | DeLuca et al. .............. 371/25 |
| 5,425,076 A | * | 6/1995 | Knippelmer ................ 379/27 |
| 5,613,217 A | * | 3/1997 | Hagstrom et al. .......... 455/67.1 |
| 5,867,813 A | | 2/1999 | Di Pietro et al. ........... 704/202 |
| 6,088,582 A | * | 7/2000 | Canora et al. ............ 455/226.1 |
| 6,127,966 A | * | 10/2000 | Erhage ...................... 342/174 |
| 6,128,474 A | * | 10/2000 | Kim et al. ................. 455/67.1 |
| 6,289,216 B1 | * | 9/2001 | Koh et al. .................. 455/424 |
| 6,424,837 B1 | * | 7/2002 | Hall et al. .................. 455/456 |

FOREIGN PATENT DOCUMENTS

| | | | |
|---|---|---|---|
| EP | 0 767 552 A2 | 4/1997 | ........... H04B/17/00 |

OTHER PUBLICATIONS

European Search Report, dated Jun. 9, 2000.

* cited by examiner

Primary Examiner—Vivian Chin
Assistant Examiner—Marceau Milord

(57) ABSTRACT

A radio transmission link between at least one radio transmission device is monitored and at least one radio reception device. Radio transmission links between at least one transmission antenna and one reception antenna are monitored for faults. At least one radio reception device is tuned to the transmission frequency of at least one radio transmission device. The at least one radio transmission device then transmits, during a predetermined time period, a predetermined test signal which is recorded, evaluated and stored as a reference signal in the at least one radio reception device during a predetermined time period. At the start of a test phase, at least one radio transmission device transmits the predetermined test signal. The test signal is compared with the stored reference signal, and an error signal is produced if the comparison result shows that the test signal has changed beyond a predetermined extent with respect to the stored reference signal.

5 Claims, 1 Drawing Sheet

METHOD AND SYSTEM FOR MONITORING A RADIO TRANSMISSION LINK

BACKGROUND OF THE INVENTION

1. Field of the Invention

The invention relates to a method for monitoring a radio transmission link between at least one radio transmission device and at least one radio reception device, and to a radio transmission system, particularly for carrying out such a method. The invention also relates to a radio reception apparatus for use in such a radio transmission system.

2. Description of the Related Art

Radio communication systems, particularly mobile radio systems, have in the meantime reached a high technological standard and are becoming more and more widespread. One important component which determines the performance of radio communication systems is antennas. To be able to ensure that a radio communication system is operable, the individual modules, particularly the antennas in the radio communication system, have to be monitored. Antennas are extremely difficult to monitor, however, because they are generally positioned in places which are difficult to access. Radio communication system operators therefore have an urgent requirement to be able to establish, simply and reliably, whether the antennas or the supply cables from the respective radio communication system to the corresponding antenna are briefly or permanently faulty. For example, an antenna which has been damaged by a storm or by corrosion results in considerable deterioration in the transmission quality of the airway situated in between.

SUMMARY OF THE INVENTION

The invention is therefore based on the object of providing a method, a radio transmission system and a radio reception apparatus which can be used for simple and reliable monitoring of a radio transmission link between at least one transmission antenna and at least one reception antenna.

The invention makes use of the fact that radio communication systems have a plurality of radio transmission devices and radio reception devices with dedicated transmission and reception antennas, so that, between a transmission antenna and a reception antenna, a closed RF path is formed from the transmission antenna to the reception antenna. This means that a signal emitted by a transmission antenna is received at a reception antenna and can be evaluated by the reception device associated with the latter.

To monitor a radio transmission link between at least one radio transmission device and at least one radio reception device, the at least one radio reception device is first tuned to the transmission frequency of the at least one radio transmission device. The at least one radio transmission device transmits a predetermined test signal during a predetermined time period. At this juncture, it should in fact be pointed out that the test signal can, for example, be a signal with a constant signal level or a signal with predetermined, for example discrete, level changes. The test signal transmitted by the at least one radio transmission device is recorded and evaluated by the at least one radio reception device during a predetermined time period. The predetermined time period can be chosen such that the test signal can be evaluated reliably in order that it may be possible to filter out random attenuation fluctuations on the radio transmission link, caused by a bird sitting on an antenna, for example. Each evaluated test signal is then stored in the at least one radio reception device for subsequent test purposes. Storage of the test signal as a reference signal ends the so-called initialisation phase of the radio communication system.

During a test phase of predetermined duration, at least one radio transmission device transmits the predetermined test signal. In the at least one radio reception device, the test signal emitted by the at least one radio transmission device is compared with the stored reference signal during the test phase and is evaluated. If the evaluation shows that the test signal has changed beyond a predetermined extent with respect to the stored reference signal, an error signal is produced which signals that the radio transmission link is faulty. This will generally mean antenna damage. However, it should be pointed out that this method does not enable the location of the fault within the radio transmission link to be determined, but only allows reliable ascertainment of whether or not the radio transmission link is faulty. In this case, the duration of the test phase can again be chosen so that short-term random attenuation changes on the radio transmission link are not taken into account. Otherwise, for example, a passing bird or aeroplane could cause incorrect interpretation of the state of the radio transmission link.

The method makes it possible, therefore, to monitor the radio transmission link between a radio transmission device and a plurality of radio reception devices all tuned to the transmission frequency of the single radio transmission device. It is also possible to monitor radio transmission links between a plurality of radio transmission devices and a single radio reception device. For this, the radio reception device must be tuned to the respective transmission frequencies of the individual radio transmission devices, and a reference signal from the respective radio transmission device must be stored in the radio reception device in each case.

So that the at least one radio reception device can derive a reference signal from the received test signal, at the start of the initialisation phase, the at least one radio transmission device transmits its operating mode and the test signal type to the at least one radio reception device. The radio transmission device can operate in burst or continuous mode, for example.

First a reference level and then only relative level changes with respect to the reference level of the test signal to be transmitted are transmitted to the at least one radio reception device.

In addition, the at least one radio reception device stores a tolerance range which defines the upper and the lower level limit within which the received test signal is permissibly situated in order to be evaluated as a reference signal. If, at least intermittently, the test signal is situated within the predetermined tolerance range during the predetermined time period, the recorded and evaluated test signal is stored as a reference signal. Otherwise, the initialisation phase must be repeated.

A critical factor for reliable and operationally correct monitoring of the radio transmission link is, amongst other things, the stability of the transmission signal, which is similarly also taken into account in the chosen tolerance range.

In order to be able to detect natural ageing phenomena and temperature fluctuations, the initialisation phase is repeated at predetermined instants, so that corrected reference signals can be formed. Expediently, the reference signals from each repeated initialisation phase are stored so that it is thus possible to obtain an indication about long-term attenuation changes on the monitored radio transmission link.

The invention provides a radio transmission system which comprises at least one radio transmission device, designed for transmitting a predetermined test signal, and at least one radio reception device. The radio reception device has at least one device which can be tuned to the transmission frequency of at least one radio transmission device, a device for recording and evaluating the test signal from the at least one radio transmission device during a predetermined time period, a device for storing at least one test signal as a reference signal, a device for comparing and evaluating the test signal received from the at least one radio transmission device with the corresponding reference signal during a test phase of predetermined duration, and a device for producing an error signal. The error signal is produced only if the comparison and evaluation device signals that the test signal has changed beyond a predetermined extent with respect to the stored reference signal.

DETAILED DESCRIPTION OF THE INVENTION

Figure 1:
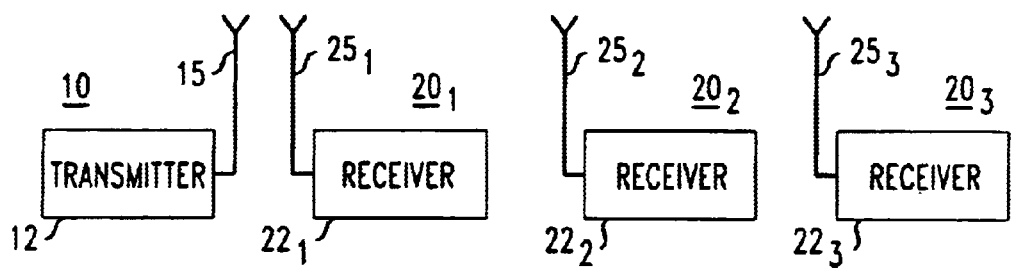
FIG. 1 shows a radio transmission system having a radio transmission device and three radio reception devices and in which the invention is implemented.

FIG. 1 shows an illustrative radio transmission system which, for the sake of simpler illustration, has only one radio transmission device 10 and only three radio reception devices $20_1$ to $20_3$. The radio transmission device 10 comprises a transmitter 12 and an antenna 15. Each radio reception device $20_1$ to $20_3$ comprises a receiver $22_1$, $22_2$ or $22_3$ and a reception antenna $25_1$, $25_2$ or $25_3$. The radio transmission system shown in FIG. 1 can, of course, contain further radio transmission devices and further radio reception devices.

Figure 3:
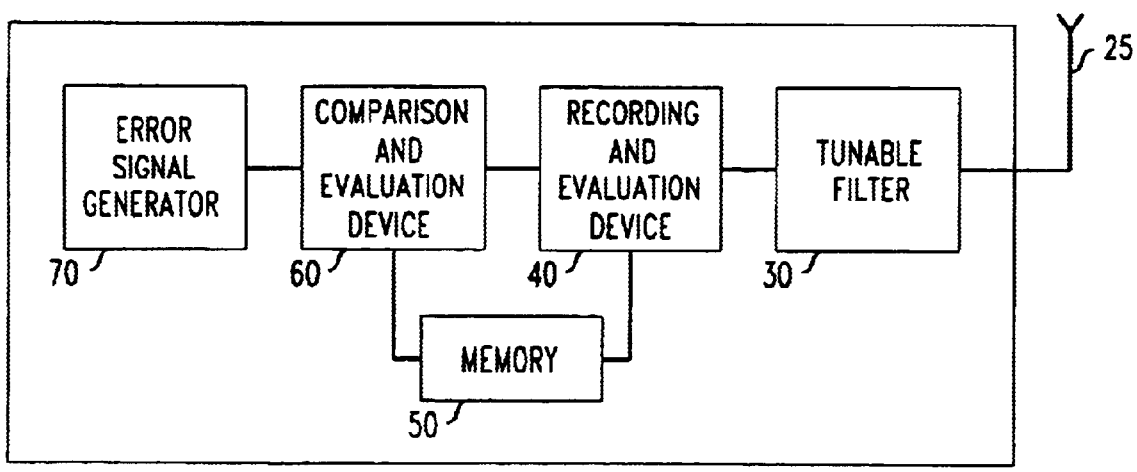
FIG. 3 shows the block diagram of a radio reception device as shown in FIG. 1 or 2.

FIG. 3 shows a very simplified block diagram of the receivers $22_1$ to $22_3$. Each receiver contains at least one tuneable filter 30 which can be tuned to the transmission frequency of a transmitter. Each receiver also has a device 40 which can be used to record and evaluate the test signal coming from a transmitter. A memory 50 is connected to the recording and evaluation device 40, which stores the test signal as a reference signal in the memory 50. The recording and evaluation device 40 can also check whether the test signal to be evaluated is situated within a predetermined tolerance range, which can be stored in the memory 50 or in a separate memory (not shown). In order for it to be possible, during a test phase, to compare the test signal emitted by a transmitter with the stored reference signal and to evaluate it, a comparison and evaluation device 60 is provided whose one input is connected to the memory 50 and whose other input is connected to the recording and evaluation device 40. At the output, the comparison and evaluation device 60 is connected to a generator 70 which produces an error signal only if the comparison and evaluation device 60 signals that the test signal currently being evaluated has changed beyond a predetermined extent with respect to the stored reference signal.

The way in which the radio transmission system shown in FIG. 1 works is described in more detail below. The first assumption is that the radio transmission link between the radio transmission device 10 and the three radio reception devices $20_1$ to $20_3$ is to be monitored. Monitoring of the radio transmission link essentially comprises two phases, namely the so-called initialisation phase and the actual monitoring phase. The initialisation phase serves for each receiver to obtain and store a reference signal from a predetermined test signal, emitted by the antenna 15, for the actual monitoring phase.

The initialisation phase first begins with the receivers $22_1$ to $22_3$ being tuned to the transmission frequency of the transmitter 12. For this, the receivers are connected, for example via a wire connection, to the transmitter 12 or to a central monitoring facility transmitting the control signals to the receivers $22_1$ to $22_3$, which ensure that the filter 50 in each receiver is set to the transmission frequency of the transmitter 12. This tuning function can be carried out by an appropriately programmed control unit (not shown) in each receiver. The transmitter 12 then transmits information about its operating mode to the respective receivers $22_1$ to $22_3$. In the present example, the transmitter 12 is operating in burst mode, with continuous mode also being possible. The transmitter 12 also transmits the test signal type to each receiver $22_1$ to $22_3$. If the test signal has, for example, a predetermined signal level with a stepped profile, the receivers can be informed of the signal profile by transmission of a reference level and the relative level changes with respect to the reference level and their temporal position and duration within the test signal. The relative level changes and their temporal positions within the test signal can be transmitted from the transmitter 12 to the receivers $22_1$ to $22_3$ entirely before the actual test signal is transmitted or else before each relative level change. At this juncture, it should be pointed out that, in the case currently being described, each receiver need detect only relative level changes.

After each receiver has been notified both of the operating mode and of the test signal type, the transmitter 12 transmits the predetermined test signal in burst mode to the receivers $22_1$ to $22_3$ during a predetermined time period. The duration of the time period should be chosen to be of such a length that short-term, random attenuation changes on the transmission link, for example caused by a bird which has landed on the transmission antenna 15 or the reception antennas $25_1$ to $25_3$, do not trigger a false alarm. By way of example, the time period is between a plurality of minutes and half an hour. Since the coupling attenuation between the transmission antenna 15 and the reception antennas $25_1$ to $25_3$ is subject to natural fluctuations, each receiver stores a tolerance range defining an upper and a lower limit value. Level changes in the test signal within these limits are regarded as permissible. The test signal emitted by the transmitter 12 via the antenna 15 is passed to the receivers $22_1$, $22_2$ and $22_3$ via the reception antennas $25_1$ to $25_3$. Each receiver records and evaluates the test signal coming from the transmitter 12 in the recording and evaluation device 40 during a predetermined time period. Provided that the received test signal is situated within the stipulated tolerance range and is in relative agreement with the level profile previously transmitted to the receivers, the test signal is stored as a reference signal in the memory 50 of each receiver $22_1$ to $22_3$. This ends the initialisation phase of the radio transmission system. With this kind of measurement, the comparison between the reception power and the change in transmission power is only relative.

It should be pointed out that the initialisation phase can be repeated cyclically in order for it to be possible to compensate for ageing phenomena of the transmitter 12, which are reflected in a change in the transmission frequency, for example. This is because an up-to-date reference signal is stored in the receivers $22_1$ to $22_3$ with each initialisation phase freshly carried out.

After the initialisation phase, the actual monitoring of the radio transmission link begins. During each monitoring phase, the transmitter 12 transmits the test signal in burst or continuous mode, and this test signal can be recorded and evaluated by the radio reception devices $20_1$ to $20_3$. The test signal, which is received by each receiver $22_1$ to $22_3$ and has experienced a particular attenuation over the transmission link, is compared with the stored reference signal and evaluated in each case. If the level changes determined are situated within the stipulated tolerance range, then the whole radio transmission link is in a proper state. In particular, there is no fault in the transmission antenna 15 and the reception antennas $25_1$ to $25_3$. If, however, larger level changes between the evaluated test signal and the stored reference signal are ascertained in the comparison device 60 of a receiver, which have been caused by a snapped antenna, for example, the generator 70 of the corresponding receiver produces an error signal, which can be signalled to the transmitter 12, to the receiver or to a monitoring person in a central monitoring facility.

Figure 2:
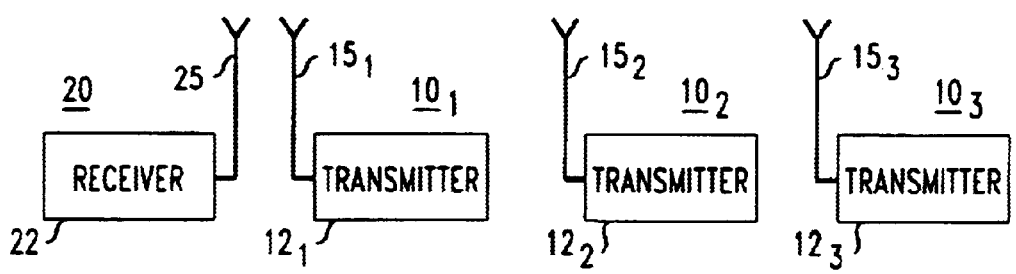
FIG. 2 shows an alternative embodiment of a radio transmission system which has a radio reception device and three radio transmission devices and in which the invention is implemented.

FIG. 2 shows a second embodiment of a radio transmission system, in which the transmission links between a radio reception device 20 and three radio transmission devices $10_1$ to $10_3$ are to be monitored. Similarly to FIG. 1, the radio reception device 20 comprises a receiver 22 and an antenna 25. The receiver 22 can be distinguished from the receivers shown in FIGS. 1 and 3 by the fact that it has three separate filters which can each be tuned to the transmission frequency of another transmitter. Alternatively, the receiver 22 can also have only one filter, which is tuned to the transmission frequency of the currently active transmitter $12_1$, $12_2$ or $12_3$ in temporal succession. The assumption for the scenario described below is that there is a receiver 22 having three separate filters. Each radio transmission device comprises a transmitter $12_1$, $12_2$ or $12_3$ and associated transmission antennas $15_1$, $15_2$ and $15_3$.

The initialisation phase begins with each of the three separate filters of the receiver 22 being tuned to the transmission frequency of a respective transmitter $12_1$, $12_2$ or $12_3$. In this way, the radio transmission links between the receiver 22 and the three transmitters $12_1$, $12_2$ and $12_3$ can be monitored at the same time. However, it is also possible to monitor the radio transmission links in temporal succession by tuning a filter of the receiver 22 to the appropriate transmission frequency before each monitoring phase. Similarly to the initialisation phase for the embodiment shown in FIG. 1, each transmitter $12_1$, $12_2$ or $12_3$ transmits a predetermined test signal which, in turn, is evaluated in the receiver 22 and is stored in a memory device, provided that each test signal is situated within a predetermined tolerance range. The operating mode and test signal type of each transmitter $12_1$, $12_2$ and $12_3$ are also transmitted to the receiver 22. As soon as the receiver 22 has evaluated each test signal from the transmitters $12_1$, $12_2$ and $12_3$ as permissible and has stored them as reference signal, the initialisation phase has ended and the test or monitoring phase for the radio transmission links can begin.

Since the monitoring phase essentially corresponds to the monitoring phase for the radio transmission system shown in FIG. 1, a detailed description has been omitted. As soon as the receiver 22 establishes a level change between a test signal currently being determined and the associated stored reference signal, the receiver 22 signals an error signal which indicates that the radio transmission link between the receiver 22 and one or more transmitters $12_1$, $12_2$ and $12_3$ is faulty.

What is claimed is:

1. Method for monitoring a radio transmission link between at least one radio transmission device and at least one radio reception device, comprising the steps of
   a) tuning the at least one radio reception device to the transmission frequency of the at least one radio transmission device; b) using the at least one radio transmission device to transmit a predetermined test signal during a predetermined time period;
   c) recording and evaluating the test signal transmitted by the at least one radio transmission device in the at least one radio reception device during a predetermined time period;
   d) storing the evaluated test signal as a reference signal in the at least one radio reception device;
   e) transmitting the predetermined test signal to the one radio reception device during a test phase of predetermined duration;
   f) comparing the predetermined test signal received by the at least one radio reception device during the test phase with the stored reference signal; an
   g) producing an error signal if the comparing step shows that the predetermined test signal has changed beyond a predetermined extent with respect to the stored reference signal.

2. The method of claim 1, wherein, before step b) is carried out, the operating mode of the radio transmission device and the test signal type are transmitted to the at least one radio reception device.

3. The method of claim 2, wherein the radio transmission devices operate in burst or continuous mode, and in that first a reference level and then relative level changes with respect to the reference level of the test signal to be transmitted are transmitted to the at least one radio reception device.

4. The method of claim 1, wherein the recorded and evaluated test signal is stored if it is situated within a predetermined tolerance range during the predetermined time period.

5. The method of claim 1, wherein steps a) to d) are repeated at predetermined instants, and in that the reference signals stored in each case in step d) are compared with one another and evaluated.

* * * * *